Figure 1:

June 12, 1928.

L. DUFAY 1,673,350

COLOR PHOTOGRAPHY OR CINEMATOGRAPHY

Filed Aug. 3, 1926

Inventor
Louis Dufay
By Marks & Clerk
Attys.

Patented June 12, 1928.

1,673,350

UNITED STATES PATENT OFFICE.

LOUIS DUFAY, OF VERSAILLES, FRANCE.

COLOR PHOTOGRAPHY OR CINEMATOGRAPHY.

Application filed August 3, 1926, Serial No. 126,780, and in France December 4, 1925.

The present invention has for its object the preparation of a photographic screen for preparing and viewing photographs in natural colors by reflection.

It is known that photographs in color can be formed on transparent supports comprising microscopic elements colored in violet, green, orange and exactly juxtaposed, and it is in this way that Lumiere's autochromes and Dufay's dioptichromes and "versicolor" are made.

Concerning the representation of the colors, the method of manufacture, the shape, the nature of the colored elements is, in fact, somewhat immaterial; it suffices that the said colored elements should be capable of effecting at each point of the surface of the screen a correct selection of the colored rays emanating from the objective.

This fundamental necessity makes it necessary to give to each of the microscopic colored elements a relatively considerable intensity of coloration.

It follows therefrom that a color image, obtained by means of and on such a screen (image which will be sufficiently luminous in order to be examined by transparency) cannot be visible by reflection, owing to the general intensity of the said screen which does not reflect any light and gives the impression of a blackboard.

It would be quite otherwise if the colored elements of the said screen had their intensity reduced to such an extent that the whole of the screen, examined by reflection, constituted a surface reflecting a sufficient quantity of light for causing the photographic image to appear thereon with a sufficient brilliancy on a clear background.

But then, the microscopic colored elements of the network would no longer have the necessary optical qualities for effecting, upon taking the negative, a correct selection of the colors.

The selecting screen or filter which is necessary and sufficient for effecting the selection and the synthesis of the colors by transparency is not therefore capable of effecting the synthesis by reflection.

On the other hand, the clear screen which would be necessary and sufficient for the synthesis by reflection or positive synthesis is, on the contrary, incapable of acting as a color selector or filter.

It has been proposed to prepare screens for positive synthesis exactly identical with the selecting screens, so that the printing of the positive images in colors can be obtained by registration of the selecting screen (or "negative screen") on the screen used for the positive. Such a result presents very great difficulties which have never been overcome owing to the extreme fineness of the colored elements constituting the screens of the extensibility of the supports, etc.

The present invention has for its object to transform a selecting screen able to take views into a corresponding screen for positive synthesis to make possible to observe the color image by reflection. For that purpose, the selecting screen can be partially discolored so as to weaken the intensity of coloration of the various selecting elements, one can use the selecting screen for producing in a sub-jacent layer in chemical contact the less intense coloration of the corresponding elements of the screen for positive synthesis; the supports for the screens can, in the latter case, be separated from each other, if need be.

In the accompanying drawings I have shown diagrammatically different ways of carrying out my process. All of the figures represent cross-sectional views of the screens as first formed or as subsequently treated.

Figure 2:

Referring more particularly to Figure 1, there is shown a transparent or translucent support G having microscopic colored elements disposed thereon and therein, said elements being indicated by the parallel lines in blocks. The emulsion is indicated by E. With this form of screen, the photograph is taken in the usual way and the translucent support G uniformly and simultaneously partially discolored by washing with water or by the action of any suitable chemical agent. After diminution of the coloration, there is formed a screen S (Figure 2) containing less color but identical of course with the original screen G. The distribution of the colored elements is of course the same in the filter S as in the original screen G. The only difference is that the intensity of the color has been reduced to a sufficient degree to make it possible to view the photograph by reflective light.

This is one of the ways in which I may prepare a suitable screen.

Figure 3:
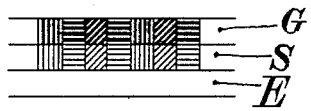

Figure 3 illustrates a more advantageous way of preparing the screen. In carrying out this process, a suitable transparent support S, such as a thin sheet of celluloid, is coated with a layer of colorless gelatin G. The screen composed of microscopic elements is formed on the gelatin layer by any known process such as that used for the manufacture of Dufay's dioptichrome screens in this layer of gelatin by means of any dye-stuffs having chemical affinity for gelatin and celluloid. Suitably chosen dye-stuffs will dye the gelatin intensely and will pass to a slight extent into the celluloid support S creating simultaneously and with absolute registration and in optical contact two screens perfectly identical as far as shape and dimension are concerned. But the gelatin screen, the upper layer, has a sufficient intensity of color for ensuring the selection of the colors, while the celluloid layer will be of low intensity, sufficient only for use as a positive screen in viewing the photograph by reflection. The photographic emulsion E is spread on the under surface of the support S.

After the photograph has been taken in the usual manner, the selecting screen, or negative screen G is removed, for instance by washing with hot or cold water and a photographic image will be obtained which may be used by reflection and to which the screen for positive synthesis S will give all its color. After washing to remove the gelatin layer, the screen will have the cross-section shown in Figure 2. This image can be transferred on any suitable reflecting support or left as such if in the layer of emulsion E are introduced substances of such a nature as to render it reflecting, for instance sulphate or baryta or the like.

Use might be made for instance as dye-stuffs of rhodamine, fuschine, safranine, auramine, malachite green, methylene blue, carmine blue, etc.

The migration of the dye-stuffs will be facilitated at will and the intensity of the reflecting screen can be regulated by attacking more or less the right side of the celluloid before spreading of the gelatin by a suitable treatment, particularly by a substratum: ether, acetic ether, acetone, etc., which will give it the required affinity.

The thickness of the support S will be a function of the size of the colored elements of the network so as to avoid any effect of parallax upon examination of the photographic proof.

Figure 4:
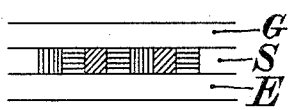

The order of superposition and the chemical nature of the layers used one on the other are given only by way of indication. Thus, gelatin can be used as sub-layer and celluloid as upper layer; instead of gelatin and celluloid, use can be made for instance of cellophane, gum, or any other transparent or translucent material. In Figure 4 I have shown a third way of preparing my screen.

Instead of discoloring the selecting screen to the layer of gelatin G can also be added a charge of sulphate of baryta or of lead, of kaolin, chalk, starch or any other inert white powder, so that the layer G loses its transparency and is transformed into a white, translucent and reflecting layer. In this case, the very intense dyes constituting the selecting screen will form a blackboard at the outer surface of the layer G, but will lose their intensity by mixture with white, in proportion as they will enter into the thickness of the said layer G. By suitably regulating, on the one hand, the thickness of the layer G and the duration of the dyeing operation and, on the other hand, the quantity of inert white powder which is added thereto, it will be easy to obtain on the lower part of the layer which is in contact with the support S, a very clear screen which, examined by the emulsified side E, will be capable of reconstituting the synthesis by reflection; the translucency of the layer does not prevent moreover the examination by transparency of the proof in colors.

Whatever may be the modus operandi adopted, it has also been noted (in case the selecting or synthesis screens were intended for printing and for the multiplication of proofs or plates in colors already obtained by means of screens composed of green, violet and orange juxtaposed elements) that it was preferable to constitute these printing networks by elements of primary color: blue—yellow—red, these elements being more able to reconstitute and to reproduce, with the maximum brilliancy and luminosity, the colors of the original image.

What I claim as my invention and desire to secure by Letters Patent is:—

1. A color screen for preparing photographs in color comprising two contiguous and separable multi-color screen layers of different relative intensities of coloration arranged so that similar colored parts of each layer coincide exactly.

2. A color screen for preparing photographs in color comprising a thin sheet of celluloid, a layer of transparent gelatin disposed thereon on one side of said celluloid, a light sensitive emulsion on the other side of said celluloid, said celluloid and gelatin being dyed with dye-stuffs having chemical affinity for both gelatine and celluloid, the celluloid being dyed to any desired intensity after the gelatin has been dyed throughout its thickness to any other desired intensity.

3. A process of producing a color screen for preparing pictures in color which comprises coating a transparent base material on one side with a second transparent material of different character than the base material, and dyeing the second transparent layer with dye-stuffs having chemical affinity for both the layer and base material so that the dye-stuff penetrates completely through the layer and into the base material.

4. A process as in claim 3 in which the base material is celluloid and the layer applied thereto is gelatin.

5. A process as in claim 3 in which the base material is celluloid and the layer applied thereto is gelatin, said celluloid being preliminarily treated, before being coated with gelatin, with a solvent for the celluloid in order to regulate the intensity of the subsequent coloration of the celluloid.

In testimony whereof I have signed my name to this specification.

LOUIS DUFAY.